US010297054B1

(12) United States Patent
Jimenez, Jr.

(10) Patent No.: US 10,297,054 B1
(45) Date of Patent: May 21, 2019

(54) HYPERDIMENSIONAL VISUALIZATION TOOL

(71) Applicant: National Technology & Engineering Solutions of Sandia, LLC, Albuquerque, NM (US)

(72) Inventor: Edward Steven Jimenez, Jr., Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 84 days.

(21) Appl. No.: 15/366,970

(22) Filed: Dec. 1, 2016

(51) Int. Cl.
*G06T 11/20* (2006.01)
*G06F 3/0481* (2013.01)

(52) U.S. Cl.
CPC .......... *G06T 11/206* (2013.01); *G06F 3/0481* (2013.01)

(58) Field of Classification Search
None
See application file for complete search history.

(56) References Cited

U.S. PATENT DOCUMENTS

2011/0035744 A1\* 2/2011 Bhatia ............... G06F 17/30893
717/174

OTHER PUBLICATIONS

Matlab Example (link: "https://stackoverflow.com/questions/6471924/side-by-side-multiply-histogram-in-matlab"; from Wayback Machine ("https://archive.org/web/" a snapshot of May 26, 2014; archival link of https://web.archive.org/web/20140526234633/https://stackoverflow.com/questions/6471924/side-by-side-multiply-histogram-in-matlab.\*
Matlab Reference Manual for functions bar( ), randn( ) and hist( ).\*
Definition of Stacked bar graph. Link: (https://en.wikipedia.org/wiki/Bar_chart#Grouped_or_stacked).\*
Definition of MATLAB. Link:(https://en.wikipedia.org/wiki/MATLAB#Graphics_and_graphical_user_interface_programming).\*

\* cited by examiner

*Primary Examiner* — Nurun N Flora
(74) *Attorney, Agent, or Firm* — Yee & Associates, P.C.

(57) ABSTRACT

A method and apparatus for displaying data. Independent data in the data is displayed by a computer system in a two-dimensional graph in a graphical user interface on a display system. Dimensions of dependent data in the data that are dependent on the independent data are displayed by the computer system in the two-dimensional graph using graphical indicators.

21 Claims, 8 Drawing Sheets

HYPERDIMENSIONAL VISUALIZATION TOOL

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer system and, in particular, to a method and apparatus for visualizing information. Still more particularly, the present disclosure relates to a method and apparatus for visualization of information with multiple dimensions in a graphical user interface on a display system.

2. Background

Data is displayed by a computer on a display device for visualization to a user. The data may take a number of different forms. For example, the data may be test data, sales data, patient information, or other types of data. This data may be stored in tables, spreadsheets, databases, or other types of data structures.

The data may be visualized in a number of different ways. For example, a graph may be displayed on a graphical user interface on the display device. Graphs may take various forms and may be selected from one of a pie chart, a bar graph, a histogram, a line graph, or some other suitable type of graph.

For example, a bar graph and a histogram are both types of graphs used to represent data with relative frequency. A bar graph is typically used to visualize categorical data. A histogram is used to visualize the type of ordinal data in which each class represents some connected interval of values. A histogram is frequently used to visualize discrete probability distributions for a discretized to approximation of continuous probability distribution.

In a visualization of the data, it is desirable to visualize multiple components of the data simultaneously. With a graph, if the data has a single dimension of dependence and the complement of the data is independence and exists within a common domain, then a two-dimensional or three-dimensional bar graph or histogram may be used to visualize the data.

A two-dimensional graph shows two dimensions of data. If additional dimensions of the data are present, then additional graphs are used to represent those additional dimensions. As the number of dimensions increase, the number of graphs increases, thus making the visualization more difficult to view and comprehend by a user.

A three-dimensional graph may be used to display multiple dimensions of the data. The three-dimensional graph, however, may not provide a desired level of visualization because of the manner in which a three-dimensional object is approximated on the display device. With a three-dimensional graph, the view of the three-dimensional graph presents some dimensions of the data, but other dimensions of the data may be obscured in the view. As a result, the user may change the view to see other dimensions. Changing the view to see other dimensions, however, may obscure previously visible dimensions in the three-dimensional graph.

Therefore, it would be desirable to have a method and apparatus that take into account at least some of the issues discussed above, as well as other possible issues. For example, it would be desirable to have a method and apparatus that overcome a technical problem with visualizing data on a display system in which the data has multiple dimensions of dependence.

SUMMARY

An embodiment of the present disclosure provides a method for displaying data. Independent data in the data is displayed by a computer system in a two-dimensional graph in a graphical user interface on a display system. Dimensions of dependent data in the data that are dependent on the independent data are displayed by the computer system in the two-dimensional graph using graphical indicators.

Another embodiment of the present disclosure provides a computer system. The computer system is comprised of a display system and a graphical controller in communication with the display system. The graphical controller displays independent data in data in a two-dimensional graph in a graphical user interface on the display system. Also, the graphical controller displays dimensions of dependent data in the data that are dependent on the independent data using graphical indicators.

Yet another embodiment of the present disclosure provides a computer program product for displaying data. The computer program product comprises a computer readable storage media, first program code, and second program code. The first program code and second program code are stored on the computer readable storage media. The first program code displays independent data in the data in a two-dimensional graph in a graphical user interface on a display system. The second program code displays dimensions of dependent data in the data that are dependent on the independent data using graphical indicators.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a tool to display data with multiple dimensions that overcomes issues with displaying this type of data using currently available two-dimensional or three-dimensional graphs. The data with multiple dimensions is referred to as hyperdimensional data.

Thus, the illustrative embodiments provide a method and apparatus for visualizing hyperdimensional data on a display system. In one illustrative example, a method is present for displaying the data in which independent data is displayed in a two-dimensional graph. Dimensions of dependent data are displayed using a first group of graphical indicators. The dimensions of the dependent data are dependent on the independent data. The dimensions of the dependent data are displayed using graphical indicators.

Figure 1:
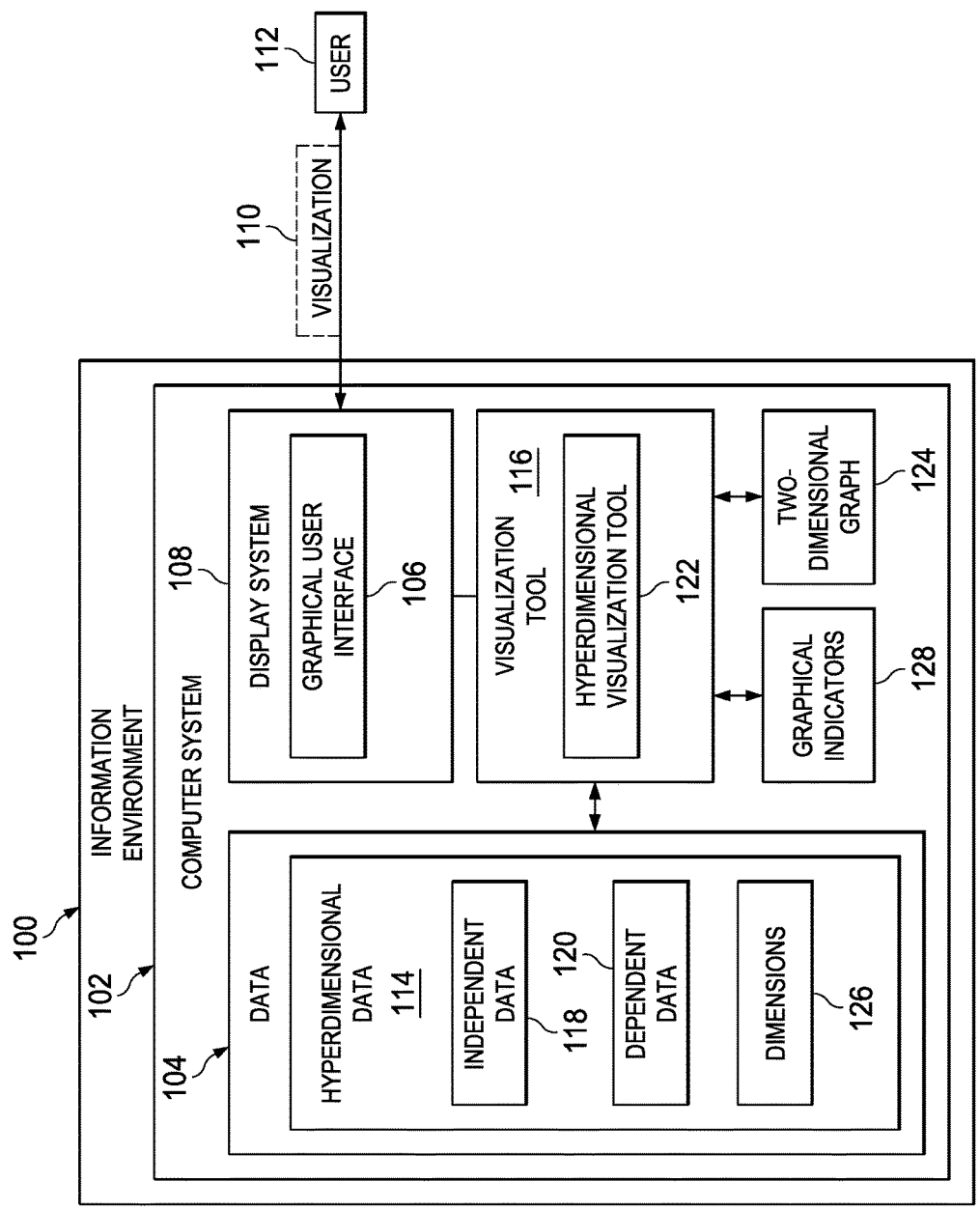
FIG. 1 is an illustration of a block diagram of an information environment in accordance with an illustrative embodiment.

With reference now to the figures and, in particular, with reference to FIG. 1, an illustration of a block diagram of an information environment is depicted in accordance with an illustrative embodiment. As depicted in this block diagram, in information environment 100, computer system 102 displays data 104 in graphical user interface 106 on display system 108. The display of data 104 in graphical user interface 106 provides visualization 110 of data 104 to user 112.

In this illustrative example, computer system 102 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, display system 108 is a physical hardware system and includes one or more display devices on which graphical user interface 106 may be displayed. The display devices may include at least one of a light emitting diode (LED) display, a liquid crystal display (LCD), an organic light emitting diode (OLED) display, or some other suitable device on which graphical user interface 106 can be displayed.

In this illustrative example, visualization tool 116 operates to display data 104 in graphical user interface 106 on display system 108 to provide visualization 110 of data 104 to user 112. User 112 is a person that may view and interact with data 104 through graphical user interface 106.

In this illustrative example, data 104 is hyperdimensional data 114. Hyperdimensional data 114 is data 104 that has two or more dimensions. Further, hyperdimensional data 114 may be represented in fewer dimensions than is actually needed through at least one of projection into a lower dimensional space, exploitation of null spaces present in the higher dimensional space, simplification of the higher dimensional space, or other techniques.

In the illustrative example, hyperdimensional data 114 includes independent data 118 and dependent data 120. Visualization tool 116 functions as hyperdimensional visualization tool 122 when displaying hyperdimensional data 114.

Visualization tool 116 in computer system 102 displays independent data 118 in data 104 in two-dimensional graph 124 on graphical user interface 106 in display system 108. Visualization tool 116 displays dimensions 126 of dependent data 120 that are dependent on independent data 118 using graphical indicators 128.

In the illustrative example, visualization tool 116 may be implemented in software, hardware, firmware, or a combination thereof. When software is used, the operations performed by visualization tool 116 may be implemented in program code configured to run on hardware, such as a processor unit. When firmware is used, the operations performed by visualization tool 116 may be implemented in program code and data and stored in persistent memory to run on a processor unit. When hardware is employed, the hardware may include circuits that operate to perform the operations in visualization tool 116.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with visualizing data on a display system in which the data has multiple dimensions. As a result, one or more technical solutions may provide a technical effect in which the visualization of independent data with multiple dimensions of dependent data may be made by using two-dimensional graph 124.

This display is performed using a single two-dimensional graph rather than multiple two-dimensional graphs. Additionally, with two-dimensional graph 124 displayed by visualization tool 116 using graphical indicators 128, independent data 118 along with the different dimensions of dependent data 120 may be visualized in a single graph, thus avoiding issues with comprehension and tying together different dimensions when data 104 is displayed in multiple graphs.

Further, with two-dimensional graph 124 generated by visualization tool 116, issues of not seeing all of the dimensions when using a three-dimensional graph are reduced. For example, all of dimensions 126 are seen in two-dimensional graph 124 without changing the view of two-dimensional graph 124.

As a result, computer system 102 operates as a special purpose computer system in which visualization tool 116 in computer system 102 enables visualization 110 of dimensions 126 of dependent data 120 in two-dimensional graph 124. In particular, visualization tool 116 transforms computer system 102 into a special purpose computer system as compared to currently available general computer systems that do not have visualization tool 116.

Figure 2:
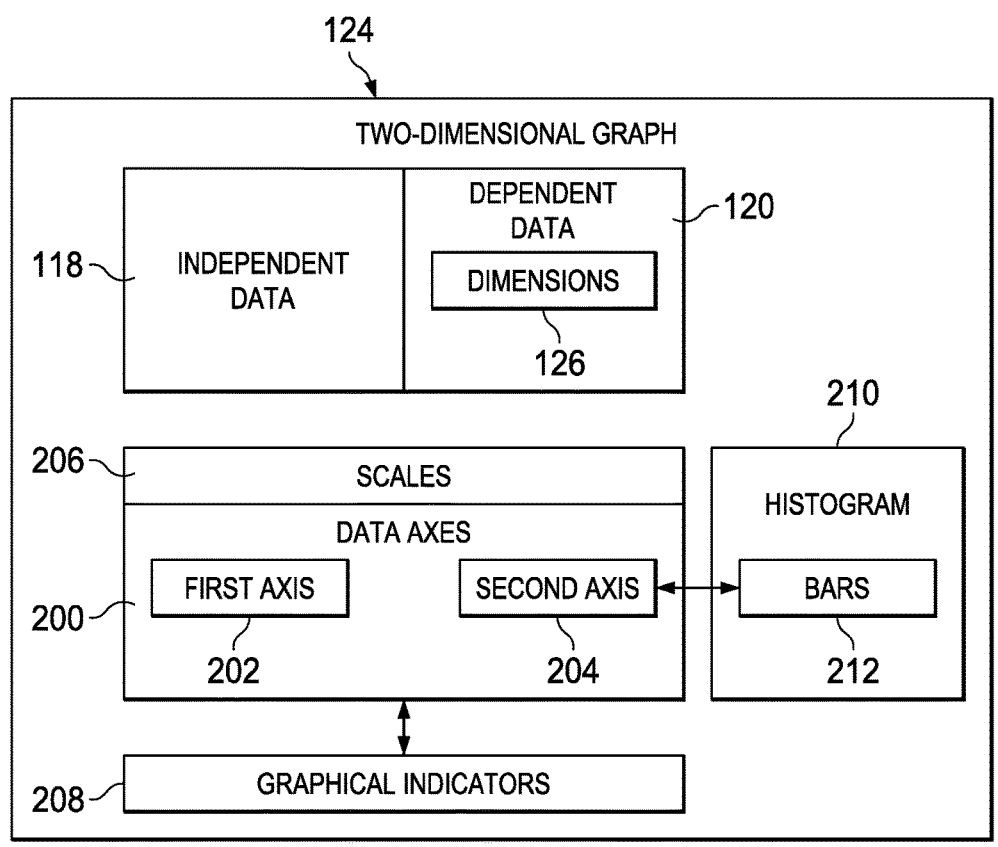
FIG. 2 is an illustration of a block diagram of a two-dimensional graph in accordance with an illustrative embodiment.

Turning next to FIG. 2, an illustration of a block diagram of a two-dimensional graph is depicted in accordance with an illustrative embodiment. In this depicted example, additional features in the display of two-dimensional graph 124 in graphical user interface 106 in FIG. 1 are shown.

In this illustrative example, two-dimensional graph 124 includes a group of data axes 200. As used herein, "a group of", when used with reference to items, means one or more items. For example, "a group of data axes 200" is one or more of data axes 200. In this particular example, the group of data axes 200 includes first axis 202, second axis 204, or both. First axis 202 is also referred to as an x-axis. Second axis 204 is also referred to as a y-axis.

Further, scales 206 may be displayed on the group of data axes 200. Scales 206 may be displayed on one or more of the group of data axes 200. Scales 206 may indicate information about data 104 in FIG. 1 displayed in two-dimensional graph 124. For example, scales 206 may include numbers, units, a description of independent data 118, or other information. Scales 206 are optional. In some illustrative examples, scales 206 may be omitted to increase at least one of privacy or confidentiality of data 104 in FIG. 1 displayed in two-dimensional graph 124.

In this illustrative example, independent data 118 is displayed along first axis 202. Dimensions 126 of dependent data 120 are displayed along second axis 204. Second axis 204 indicates frequency in this depicted example.

Independent data 118 and dimensions 126 of dependent data 120 are displayed using graphical indicators 208. As depicted, graphical indicators 208 are used to distinguish between different ones of dimensions 126 of dependent data 120. For example, graphical indicators 208 may be selected to represent different ones of dimensions 126 of dependent data 120.

In the illustrative examples, graphical indicators 208 may take different forms. For example, graphical indicators 208 are selected from one of a color, a gradient of colors, a line type, a line color, a cross hatching, an icon, a line thickness, or other suitable types of graphical indicators.

For example, when two-dimensional graph 124 is histogram 210, bars 212 in histogram 210 represent dimensions 126 of dependent data 120. Graphical indicators 208 are used to distinguish between different dimensions and dimensions 126 for dependent data 120. For example, the lines for a bar may be used to represent the one dimension in dimensions 126. Color may be used to represent another dimension in dimensions 126. In this manner, multiple dimensions may be visualized in histogram 210 using graphical indicators 208.

The illustration of information environment 100 and the different components in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, none of data axes 200 may be displayed depending on the particular implementation. In another example, independent data 118 may be displayed based on location along a second axis, such as a y-axis.

Figure 3:
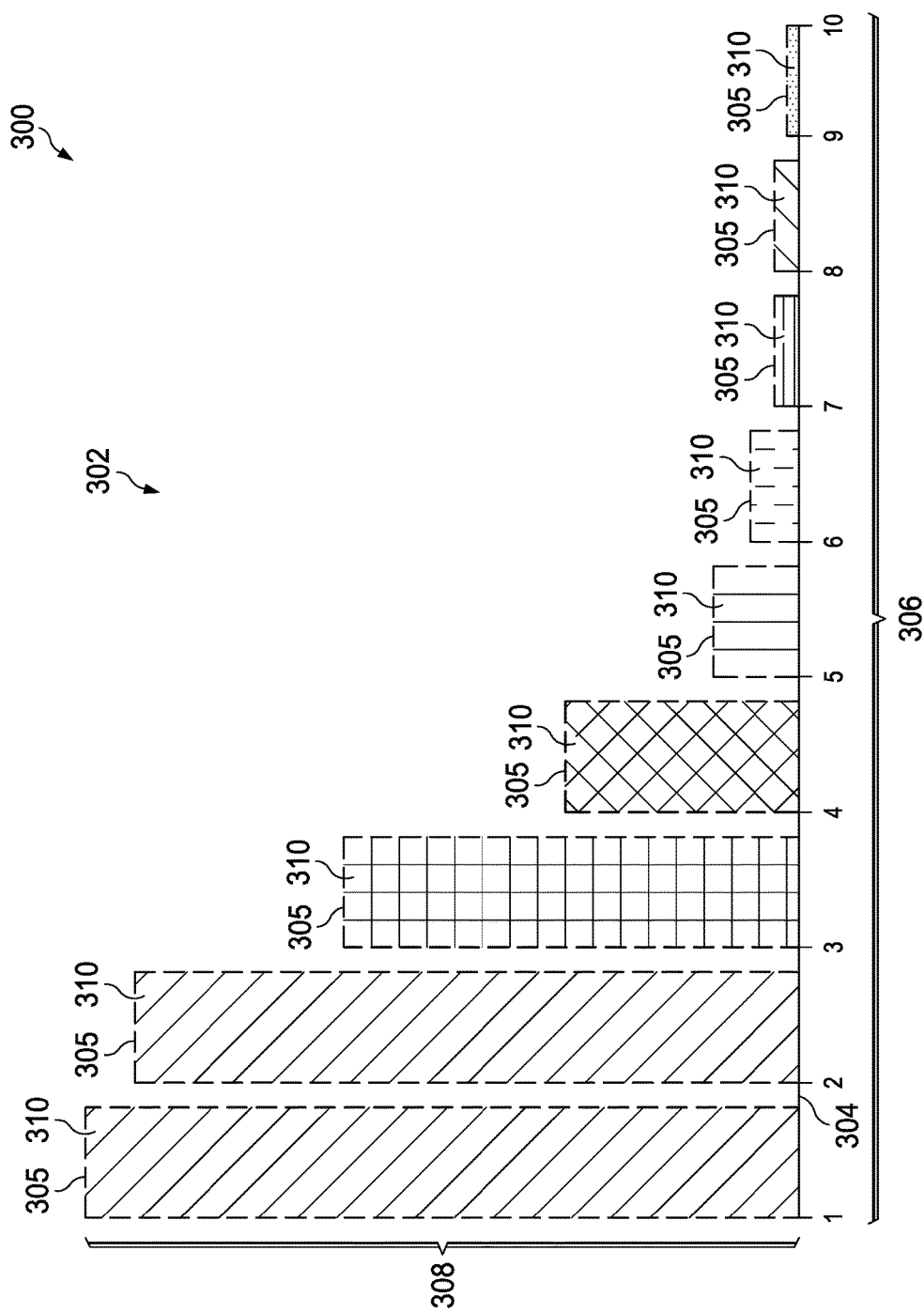
FIG. 3 is an illustration of a histogram in accordance with an illustrative embodiment.

Turning now to FIG. 3, an illustration of a histogram is depicted in accordance with an illustrative embodiment. In this illustrative example, histogram 300 is an example of one manner in which two-dimensional graph 124 in FIGS. 1 and 2 may be displayed in graphical user interface 106 on display system 108.

In this illustrative example, histogram 300 allows for the display of more than one dimension of the dependent data in histogram 300. In this illustrative, bars 302 are displayed along x-axis 304. Bars 302 are formed by graphical indicators in the form of dashed lines 305 that outline bars 302. Scale 306 is also displayed in histogram 300.

As depicted, independent data is displayed along x-axis 304 at locations on x-axis 304. In this illustrative example, two dimensions are present for the dependent data. In a particular example, the first dimension in the dimensions of the dependent data is identified using dashed lines 305 that form outlines for bars 302. Height 308 of each of bars 302 indicates frequency for dependent data on a vertical scale in this example. In this example, a y-axis and the vertical scale is not shown.

The second dimension in the dimensions of the dependent data is indicated by color 310 in bars 302. Color 310 may be different for bars 302 to provide a visualization of a dimension in dimensions that is different from the dimension represented by dashed lines 305 that outline bars 302. In other illustrative examples, a gradient of color 310 may be used for indicating values of bars 302 for the dimension in dimensions 126 in FIGS. 1-2.

As depicted, the use of dashed lines 305 for bars 302 and color 310 in bars 302 may be used as a comparator for the relative frequency of the dependent data with respect to each other. By having the bar and the color within the bars, the comparison of frequency may be more easily made in this display of histogram 300.

In this illustrative example, labels or other identifying information is not present for x-axis 304 with respect either dimension of dependent data. This absence allows obfuscation of the dependent data. In this manner, privacy requirements or desires may be met in presenting the data in histogram 300.

Figure 4:
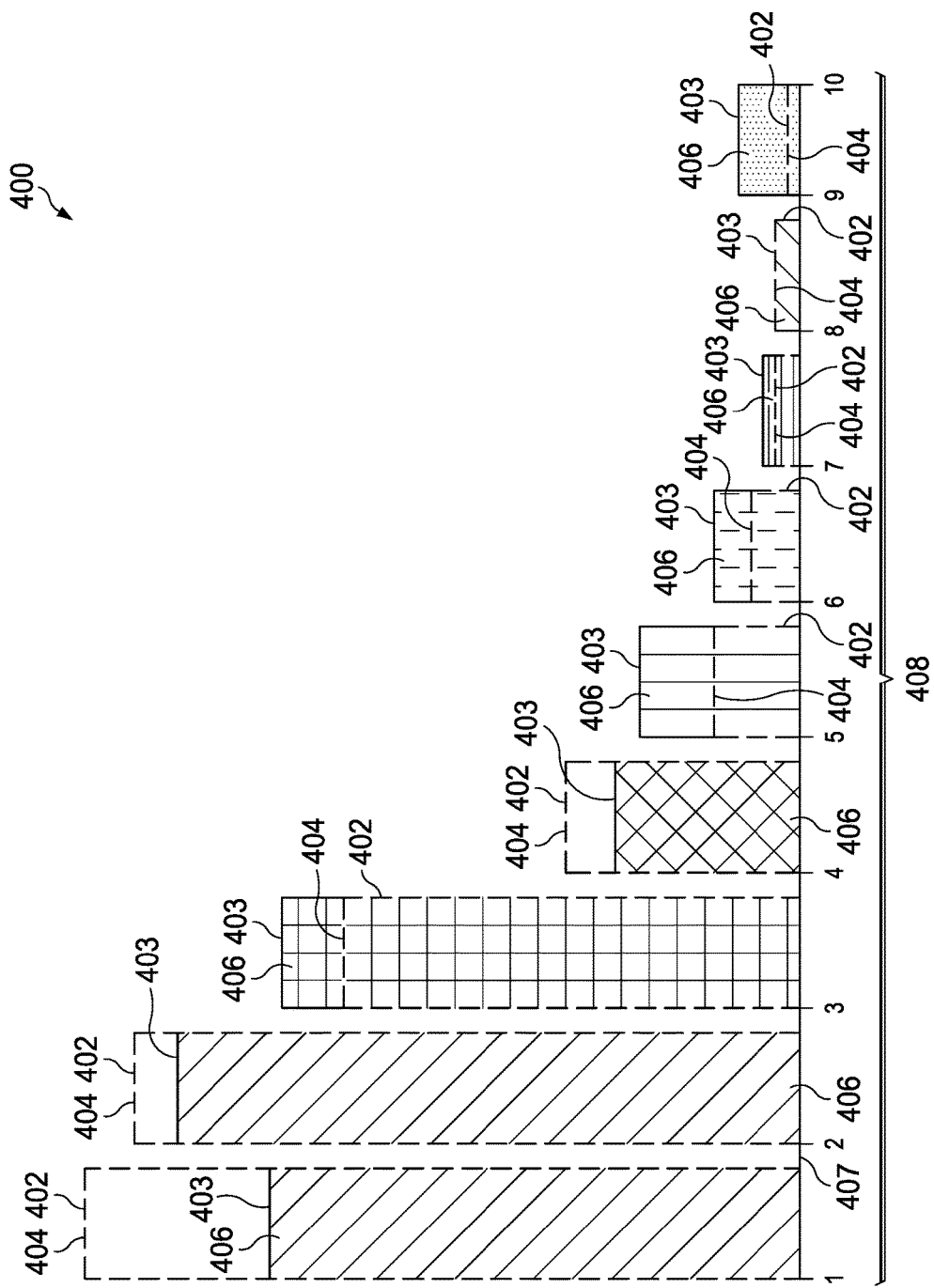
FIG. 4 is an illustration of a histogram in accordance with an illustrative embodiment.

With reference to FIG. 4, an illustration of a histogram is depicted in accordance with an illustrative embodiment. In this illustrative example, histogram 400 is an example of one manner in which two-dimensional graph 124 in FIGS. 1 and 2 may be displayed in graphical user interface 106 on display system 108.

In this illustrative example, histogram 400 includes bars 402 outlined by dashed lines 404 and color 406 for bars 403 that are displayed along x-axis 407. Scale 408 is displayed along x-axis 407. In this illustrative example, independent data is represented by locations of bars 402 shown by dashed lines 404 on x-axis 407. The independent data is based on locations of bars 402 and bars 403 on locations on x-axis 407.

Three dimensions of dependent data are shown for the independent data in this example. A first dimension in the dimensions for the dependent data is illustrated by the height of bars 402 formed by the height of dashed lines 404. The second dimension in dimensions of the dependent data is indicated by color 406 that forms bars 403. Dashed lines 404 for bars 402 and color 406 that form bars 403 are graphical indicators. The different colors used in bars 403 are graphical indicators for the third dimension in the dimensions of the dependent data.

Figure 5:
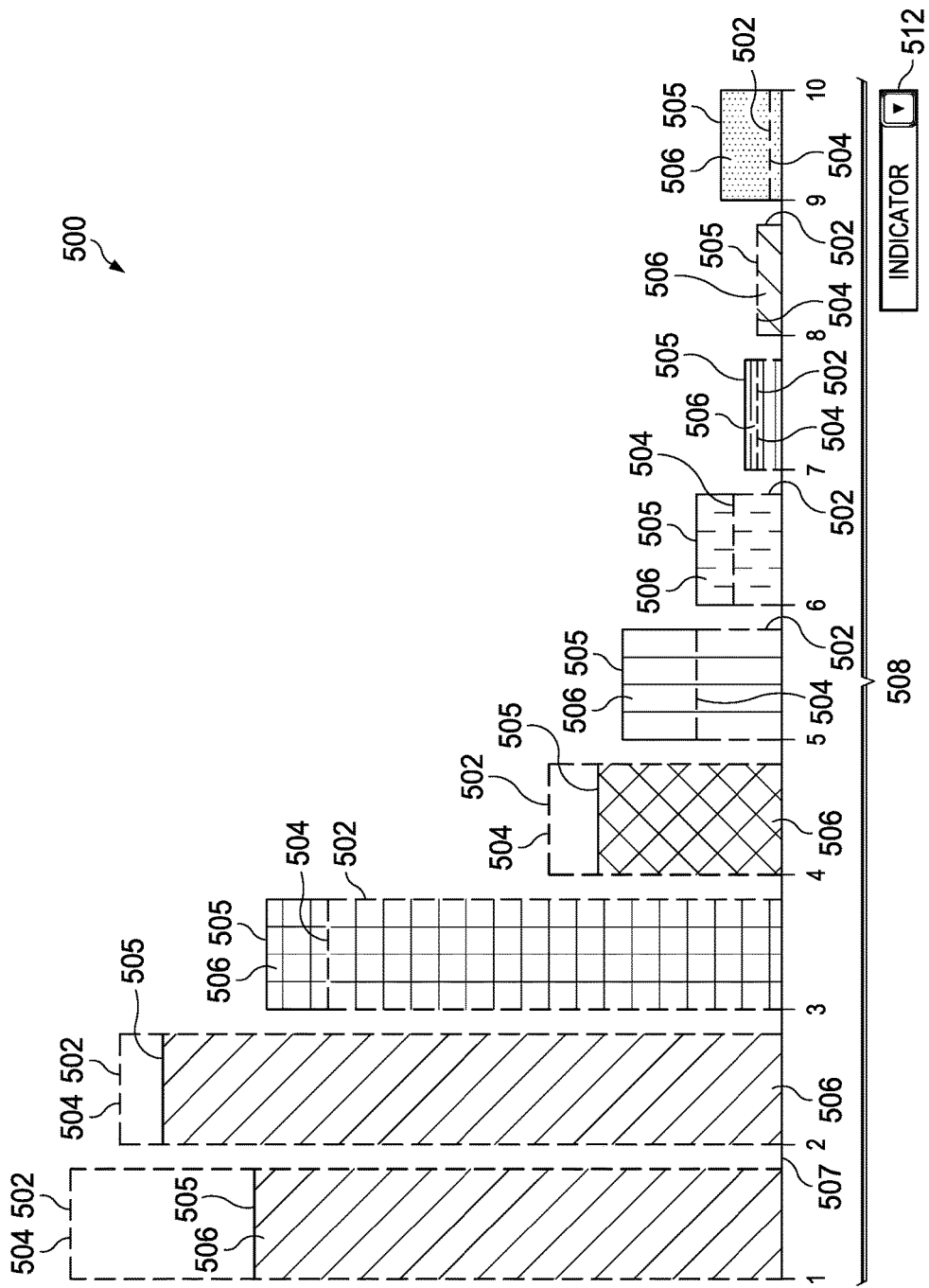
FIG. 5 is an illustration of a histogram in accordance with an illustrative embodiment.
Figure 6:
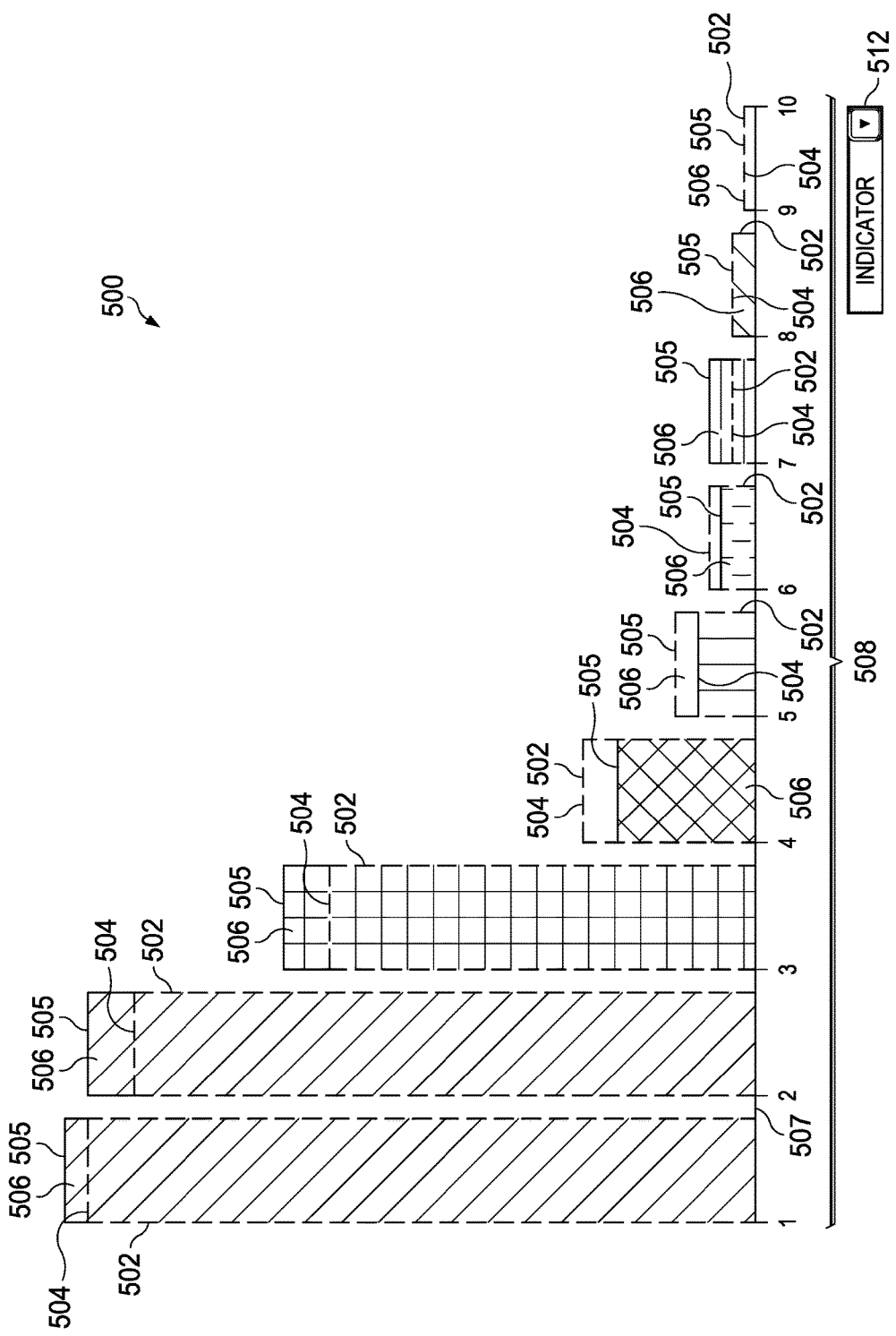
FIG. 6 is an illustration of a histogram with another set of independent data in accordance with an illustrative embodiment.

FIG. 5 and FIG. 6 illustrate a histogram with a set of independent data. In FIG. 5, an illustration of a histogram is depicted in accordance with an illustrative embodiment. In this depicted example, histogram 500 is an example of one manner in which two-dimensional graph 124 in FIGS. 1 and 2 may be displayed in graphical user interface 106 on display system 108.

As depicted, histogram 500 has bars 502 formed by dashed lines 504 and bars 505 formed by color 506. Bars 502 and bars 505 are displayed at locations along x-axis 507 and represent three dimensions of dependent data. Scale 508 is displayed along x-axis 507. In this example, the locations of bars 502 and bars 505 on x-axis 507 represent the independent data.

As depicted, the height of bars 502 and bars 505 represent values for dimensions of the dependent data, which is a frequency of the independent data in this illustrative example. Color 506 for bars 505 varies to indicate a third dimension in the dimensions of the dependent data.

Control 512 is used to change the independent data in histogram 500. For example, control 512 may be used to replace the current set of independent data with another set of independent data.

In FIG. 6, an illustration of a histogram with another set of independent data is depicted in accordance with an illustrative embodiment. In this depicted example, control 512 has been manipulated to select another set of independent data. As a result, height of bars 502 and bars 505 change to represent the dependent data for the new set of independent data. Additionally, color 506 also changes to represent the dependent data for the new set of independent data.

The illustration of two-dimensional graphs in form of histograms in FIGS. 3-5 are presented only as examples of some implementations for two-dimensional graph 124 in FIGS. 1-2. These illustrations are not meant to limit the manner in which other illustrative examples may be implemented. For example, in FIG. 4, dashed lines 404 also may be colored to provide a fourth dimension of dependent data that is displayed within histogram 400. Different colors or a gradient of color may be used for dashed lines 404.

Figure 7:
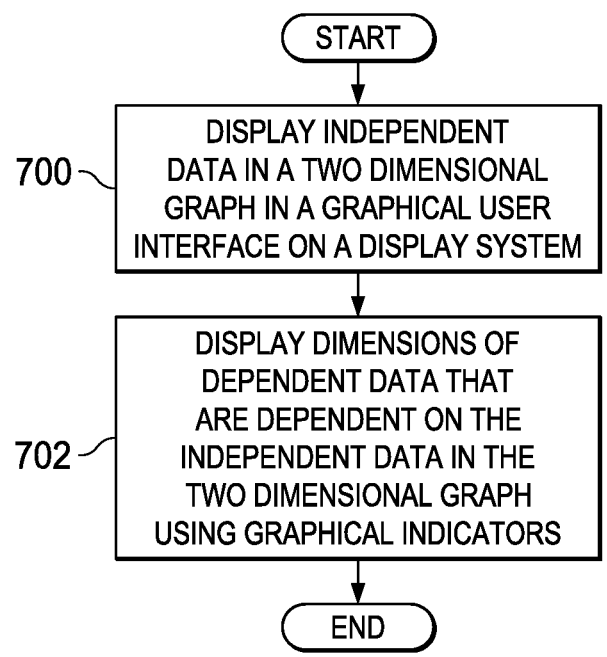
FIG. 7 is an illustration of a flowchart of a process for displaying data in accordance with an illustrative embodiment.

Turning next to FIG. 7, an illustration of a flowchart of a process for displaying data is depicted in accordance with an illustrative embodiment. The process illustrated in FIG. 7 may be implemented in visualization tool 116 in FIG. 1.

The process begins by displaying independent data in a two-dimensional graph in a graphical user interface on a display system (step 700). The process then displays dimensions of dependent data that are dependent on the independent data in the two-dimensional graph using graphical indicators (step 702). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
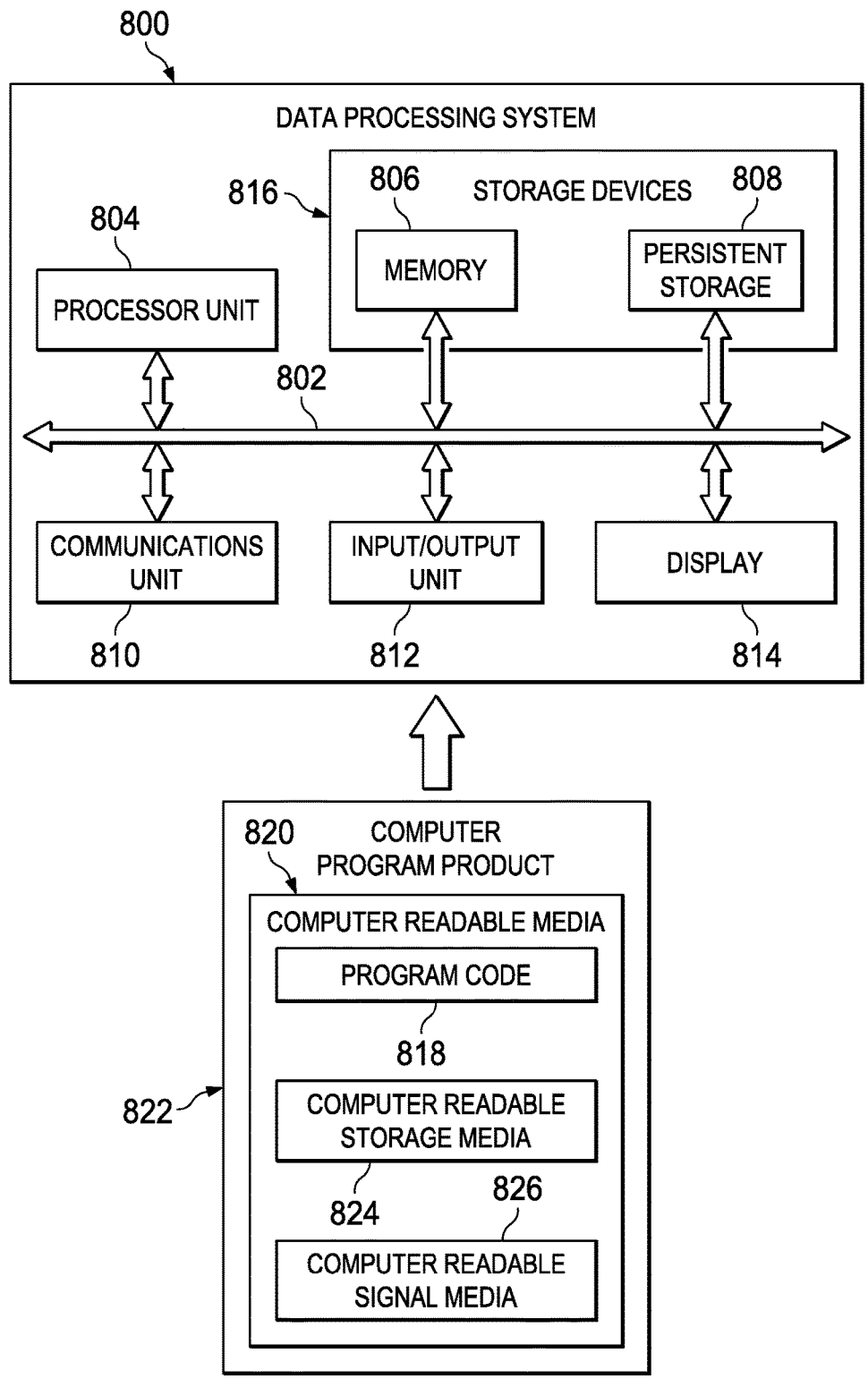
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement computer system 102 in FIG. 1. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative embodiments provide a method and apparatus for visualizing data. In one illustrative example, the data is displayed in a two-dimensional graph. Independent data is represented along a first axis. This axis may be horizontal or an x-axis. The dependent data is represented as a frequency for each of the locations. The frequency may be represented using a group of graphical indicators. With graphical indicators, multiple dimensions may be represented at each location on the first axis.

In this manner, one or more illustrative examples overcome a technical problem in which the visualization of independent data with multiple dimensions of dependent data using current techniques. As a result, one or more technical solutions may provide a technical effect in which the visualization of the independent data with multiple dimensions of the dependent data made be made using a two-dimensional graph.

For example, with the two-dimensional graph generated by a visualization tool operating in accordance with an illustrative example, issues of not seeing different dimensions at different angles with a three-dimensional graph may be avoided. Additionally, with the two-dimensional graph displayed by the visualization tool using the graphical indicators, the independent data along with the different dimensions of the dependent data may be visualized in a single graph, thus avoiding issues with comprehension and tying together different dimensions when the data is displayed in multiple graphs.

Further, the use of the two-dimensional graph generated by the visualization tool reduces issues of not seeing different dimensions at different angles with a three-dimensional graph. All of the dimensions of the dependent data are seen in the two-dimensional graph without changing the view.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying data, the method comprising:
  displaying, by a computer system, independent data in the data in a two-dimensional graph in a graphical user interface on a display system, wherein the two-dimensional graph is a histogram; and
  displaying, by the computer system, dimensions of dependent data in the data that are dependent on the independent data in the two-dimensional graph using graphical indicators, wherein differently colored dashed lines that form outlines for bars of the histogram represent a first dimension of the dependent data, wherein heights of the bars indicates frequency for the dependent data, wherein colors inside the bars represent a second dimension of the dependent data, and wherein horizontal lines having different colors represent a third dimension of the dependent data.

2. The method of claim 1 further comprising:
displaying, by the computer system, a group of data axes.

3. The method of claim 1 further comprising:
displaying, by the computer system, scales for the data.

4. The method of claim 1, wherein a color gradient of the differently colored dashed lines indicates a fourth dimension of the dependent data.

5. The method of claim 4, wherein a line thickness of the horizontal lines indicates a fifth dimension of the dependent data.

6. The method of claim 1, wherein the graphical indicators are selected from at least one of a color, a gradient of colors, a line type, a line color, a cross hatching, an icon, or a line thickness.

7. The method of claim 5, wherein cross hatching within the bars indicates a sixth dimension of the dependent data.

8. A computer system comprising:
a display system; and
a graphical controller in communication with the display system, wherein the graphical controller displays independent data in data in a two-dimensional graph in a graphical user interface on the display system; and displays dimensions of dependent data in the data that are dependent on the independent data using graphical indicators, wherein the two-dimensional graph is a histogram, wherein differently colored dashed lines that form outlines for bars of the histogram represent a first dimension of the dependent data, wherein heights of the bars indicates frequency for the dependent data, wherein colors inside the bars represent a second dimension of the dependent data, and wherein horizontal lines having different colors represent a third dimension of the dependent data.

9. The computer system of claim 8, wherein the graphical controller displays a group of data axes.

10. The computer system of claim 8, wherein the graphical controller displays scales for the data.

11. The computer system of claim 8, wherein a color gradient of the differently colored dashed lines indicates a fourth dimension of the dependent data.

12. The computer system of claim of claim 11, wherein a line thickness of the horizontal lines indicates a fifth dimension of the dependent data.

13. The computer system of claim 8, wherein the graphical indicators are selected from at least one of a color, a gradient of colors, a line type, a line color, a cross hatching, an icon, or a line thickness.

14. The computer system of claim 12, wherein cross hatching within the bars indicates a sixth dimension of the dependent data.

15. A computer program product for displaying data, the computer program product comprising:
a computer readable storage media;
first program code, stored on the computer readable storage media, for displaying independent data in the data in a two-dimensional graph in a graphical user interface on a display system, wherein the two-dimensional graph is a histogram; and
second program code, stored on the computer readable storage media, for displaying dimensions of dependent data that are dependent on the independent data using graphical indicators, wherein differently colored dashed lines that form outlines for bars of the histogram represent a first dimension of the dependent data, wherein heights of the bars indicates frequency for the dependent data, wherein colors inside the bars represent a second dimension of the dependent data, and wherein horizontal lines having different colors represent a third dimension of the dependent data.

16. The computer program product of claim 15 further comprising:
third program code, stored on the computer readable storage media, for displaying a group of data axes.

17. The computer program product of claim 15 further comprising:
third program code, stored on the computer readable storage media, for displaying scales for the data.

18. The computer program product of claim 15, wherein a color gradient of the differently colored dashed lines indicates a fourth dimension of the dependent data.

19. The computer program product of claim 18, wherein a line thickness of the horizontal lines indicates a fifth dimension of the dependent data.

20. The computer program product of claim 15, wherein the graphical indicators are selected from at least one of a color, a gradient of colors, a line type, a line color, a cross hatching, an icon, or a line thickness.

21. The computer program product of claim 19, wherein cross hatching within the bars indicates a sixth dimension of the dependent data.

\* \* \* \* \*